US010218785B2

(12) United States Patent
Sun et al.

(10) Patent No.: US 10,218,785 B2
(45) Date of Patent: Feb. 26, 2019

(54) OPPORTUNISTIC SYNC BLOCK TRANSMISSION FOR MM WAVE NR-SS

(71) Applicant: QUALCOMM Incorporated, San Diego, CA (US)

(72) Inventors: Jing Sun, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 15/688,239

(22) Filed: Aug. 28, 2017

(65) Prior Publication Data

US 2018/0159926 A1 Jun. 7, 2018

Related U.S. Application Data

(60) Provisional application No. 62/429,616, filed on Dec. 2, 2016.

(51) Int. Cl.
*H04W 4/00* (2018.01)
*H04L 29/08* (2006.01)
(Continued)

(52) U.S. Cl.
CPC ......... *H04L 67/1085* (2013.01); *H04W 40/04* (2013.01); *H04W 56/0015* (2013.01);
(Continued)

(58) Field of Classification Search
None
See application file for complete search history.

(56) References Cited

U.S. PATENT DOCUMENTS

2016/0100404 A1    4/2016   Han et al.
2016/0183205 A1    6/2016   Li et al.
(Continued)

FOREIGN PATENT DOCUMENTS

WO    WO-2016182602 A1    11/2016

OTHER PUBLICATIONS

Alcatel-Lucent et al., "AGC and Time and Frequency Synchronization for LAA DL", 3GPP Draft; R1-151482, 3rd Generation Partnership Project (3GPP), Mobile Competence Centre; 650, Route Des Lucioles; F-05921 Sophia-Anti Polls Cedex; France, vol. RAN WG1, No. Belgrade, Serbia; Apr. 19, 2015, XP050934354, Retrieved from the Internet: URL:http://www.3gpp.org/ftp/Meetings_3GPP_SYNC/RAN1/Docs/ [retrieved on Apr. 19, 2015), 3 pages.

(Continued)

*Primary Examiner* — Erika A Washington
(74) *Attorney, Agent, or Firm* — Liem T. Do

(57) ABSTRACT

Opportunistic synchronization block transmission for millimeter (mm) wave (mmW) new radio (NR) shared spectrum (NR-SS) is disclosed. In the shared spectrum operations, additional opportunities for synchronization signaling are provided by piggy backing a single shot, opportunistic synchronization (sync) block onto the directional beam used for transmitting a data burst to a served user equipment. Instead of transmitting a whole sync slot, which includes sync blocks for each directional beam available at the participating mmW base station, the existing directional beam of the data burst is leveraged for transmitting the opportunistic sync block for that direction. The opportunistic sync block provides initial acquisition UEs with opportunity to obtain network access information, including timing and random access opportunities, for obtaining access to the network.

30 Claims, 9 Drawing Sheets

(51) Int. Cl.
    *H04W 40/04*     (2009.01)
    *H04W 56/00*     (2009.01)
    *H04W 72/04*     (2009.01)
    *H04W 72/08*     (2009.01)
    *H04W 88/04*     (2009.01)

(52) U.S. Cl.
    CPC ..... *H04W 56/0025* (2013.01); *H04W 72/042* (2013.01); *H04W 72/082* (2013.01); *H04W 88/04* (2013.01)

(56) References Cited

U.S. PATENT DOCUMENTS

2017/0012729 A1     1/2017   Thomas et al.
2017/0094624 A1     3/2017   Balachandran et al.
2017/0142751 A1*   5/2017   Liu ...................... H04L 5/1415

OTHER PUBLICATIONS

International Search Report and Written Opinion—PCT/US2017/060802—ISA/EPO—dated Feb. 19, 2018.
QUALCOMM Inc: "Multi-beam RACH Design and Evalution", 3GPP TSG RAN WG1 Meeting #87, R1-1612031, Reno, NV, U.S.A, Nov. 14-18, 2016, pp. 1-11.
QUALCOMM Inc: "Muiti-beam SYNC Design"; 3GPP TSG RAN WG1 Meeting #87, R1-1612024, Reno, Nevada, USA. Nov. 14-18, 2016, pp. 1-10.

\* cited by examiner

OPPORTUNISTIC SYNC BLOCK TRANSMISSION FOR MM WAVE NR-SS

CROSS-REFERENCE TO RELATED APPLICATIONS

The present application claims priority to co-pending U.S. Provisional Patent Application No. 62/429,616, entitled "OPPORTUNISTIC SYNC BLOCK TRANSMISSION FOR MM WAVE NR-SS", filed Dec. 2, 2016, the disclosure of which is hereby incorporated herein by reference.

BACKGROUND

Field

Aspects of the present disclosure relate generally to wireless communication systems, and more particularly, to opportunistic synchronization block transmission for millimeter (mm) wave (mmWave) new radio (NR) shared spectrum (NR-SS).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication in a wireless network includes scheduling, at a base station, a data burst for transmission to a UE on a target directional beam of a plurality of directional beams available to the base station, wherein the target directional beam is beamformed according to a direction of the UE, generating an opportunistic synchronization block including network access information usable by a non-served UE to access the wireless network, and transmitting the data burst to the UE, wherein the opportunistic synchronization block is embedded in the data burst.

In an additional aspect of the disclosure, a method of wireless communication includes monitoring, by a UE, for an opportunistic synchronization block on a directional beam, obtaining additional network access information associated with the opportunistic synchronization block in response to detection of the opportunistic synchronization block, wherein the additional network access information is in addition to timing information carried by a normal synchronization block, and wherein the additional network access information includes network timing information and identification of one or more random access opportunities, and transmitting a random access signal on the one or more random access opportunities according to the network timing information.

In an additional aspect of the disclosure, an apparatus configured for wireless communication includes means for scheduling, at a base station, a data burst for transmission to a UE on a target directional beam of a plurality of directional beams available to the base station, wherein the target directional beam is beamformed according to a direction of the UE, means for generating an opportunistic synchronization block including network access information usable by a non-served UE to access the wireless network, and means for transmitting the data burst to the UE, wherein the opportunistic synchronization block is embedded in the data burst.

In an additional aspect of the disclosure, an apparatus configured for wireless communication includes means for monitoring, by a UE, for an opportunistic synchronization block on a directional beam, means for obtaining additional network access information associated with the opportunistic synchronization block in response to detection of the opportunistic synchronization block, wherein the additional network access information includes network timing information and identification of one or more random access opportunities, and means for transmitting a random access signal on the one or more random access opportunities according to the network timing information.

In an additional aspect of the disclosure, a non-transitory computer-readable medium having program code recorded thereon. The program code further includes code to schedule, at a base station, a data burst for transmission to a UE on a target directional beam of a plurality of directional beams available to the base station, wherein the target directional beam is beamformed according to a direction of the UE, code to generate an opportunistic synchronization block including network access information usable by a non-served UE to access the wireless network, and code to transmit the data burst to the UE, wherein the opportunistic synchronization block is embedded in the data burst.

In an additional aspect of the disclosure, a non-transitory computer-readable medium having program code recorded thereon. The program code further includes code to monitor, by a UE, for an opportunistic synchronization block on a directional beam, code to obtain additional network access information associated with the opportunistic synchronization block in response to detection of the opportunistic synchronization block, wherein the additional network access information includes network timing information and identification of one or more random access opportunities, and code to transmit a random access signal on the one or more random access opportunities according to the network timing information.

In an additional aspect of the disclosure, an apparatus configured for wireless communication is disclosed. The apparatus includes at least one processor, and a memory coupled to the processor. The processor is configured to schedule, at a base station, a data burst for transmission to a UE on a target directional beam of a plurality of directional beams available to the base station, wherein the target directional beam is beamformed according to a direction of the UE, to generate an opportunistic synchronization block including network access information usable by a non-served UE to access the wireless network, and to transmit the data burst to the UE, wherein the opportunistic synchronization block is embedded in the data burst.

In an additional aspect of the disclosure, an apparatus configured for wireless communication is disclosed. The apparatus includes at least one processor, and a memory coupled to the processor. The processor is configured to monitor, by a UE, for an opportunistic synchronization block on a directional beam, to obtain additional network access information associated with the opportunistic synchronization block in response to detection of the opportunistic synchronization block, wherein the additional network access information includes network timing information and identification of one or more random access opportunities, and to transmit a random access signal on the one or more random access opportunities according to the network timing information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
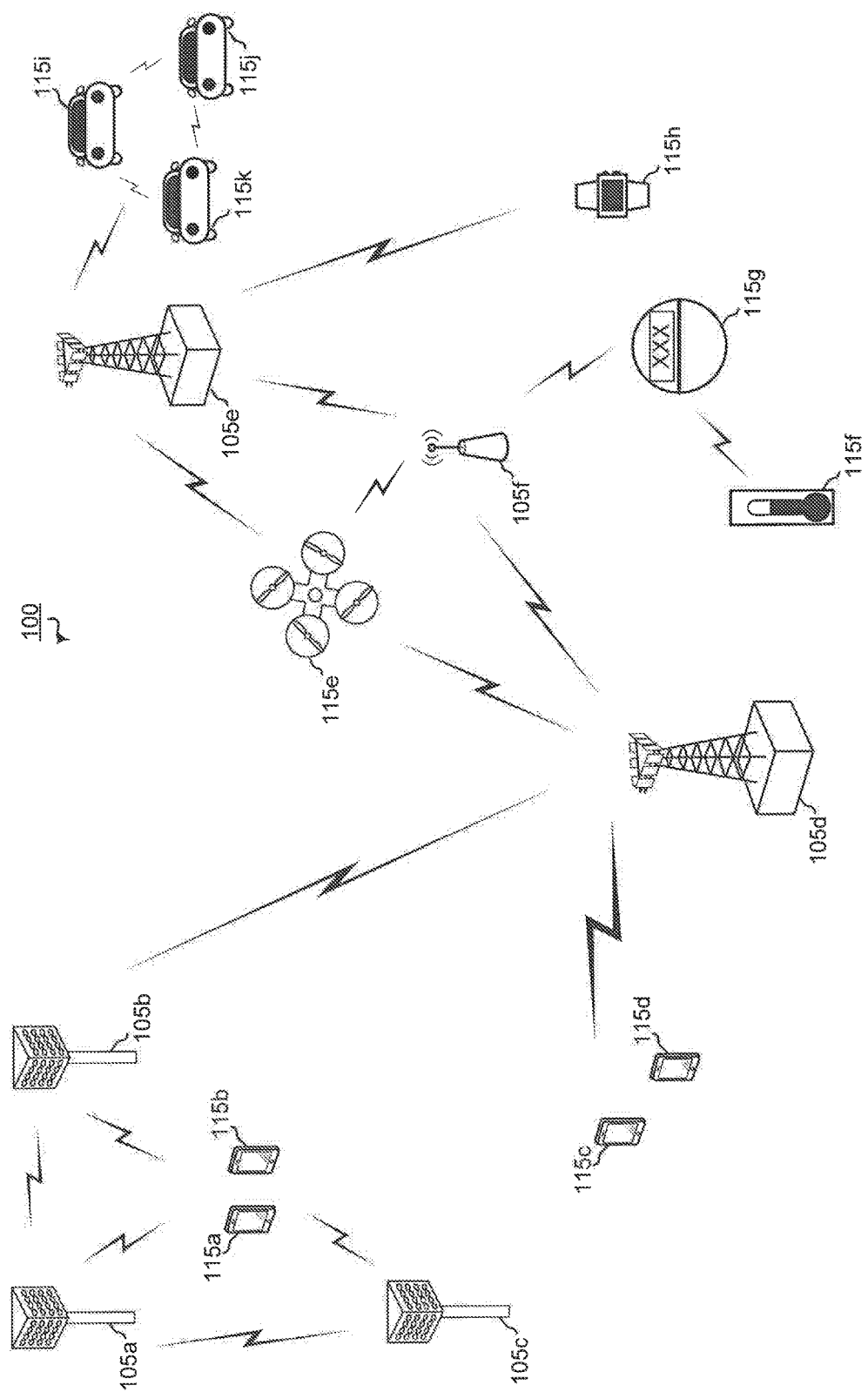
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of evolved node Bs (eNBs) 105 and other network entities. An eNB may be a station that communicates with the UEs and may also be referred to as a base station, a an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105d and 105e are regular macro eNBs, while eNBs 105a-105c are macro eNBs enabled with one of 3 dimension (3D), full dimension (FD), or massive MIMO, eNBs 105a-105c take advantage of their higher dimension MIMO capabilities to exploit 3D beamforming in both elevation and azimuth beamforming to increase coverage and capacity. eNB 105f is a small cell eNB which may be a home node or portable access point. An eNB may support one or multiple (e.g., two, three, four, and the like) cells.

The 5G network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink and/or uplink, or desired transmission between eNBs, and backhaul transmissions between eNBs.

In operation at 5G network 100, eNBs 105a-105c serve UEs 115a and 115b using 3D beamforming and coordinated spatial techniques, such as coordinated multipoint (CoMP) or multi-connectivity. Macro eNB 105d performs backhaul communications with eNBs 105a-105c, as well as small cell, eNB 105f. Macro eNB 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro eNBs 105d and 105e, as well as small cell eNB 105f. Other machine type devices, such as UE 115f (thermometer), UE 115g (smart meter), and UE 115h (wearable device) may communicate through 5G network 100 either directly with base stations, such as small cell eNB 105f, and macro eNB 105e, or in multi-hop configurations by communicating with another user device which relays its information to the network, such as UE 115f communicating temperature measurement information to the smart meter, UE 115g, which is then reported to the network through small cell eNB 105f. 5G network 100 may also provide additional network efficiency through dynamic, low-latency TDD/FDD communications, such as in a vehicle-to-vehicle (V2V) mesh network between UEs 115i-115k communicating with macro eNB 105e.

Figure 2:
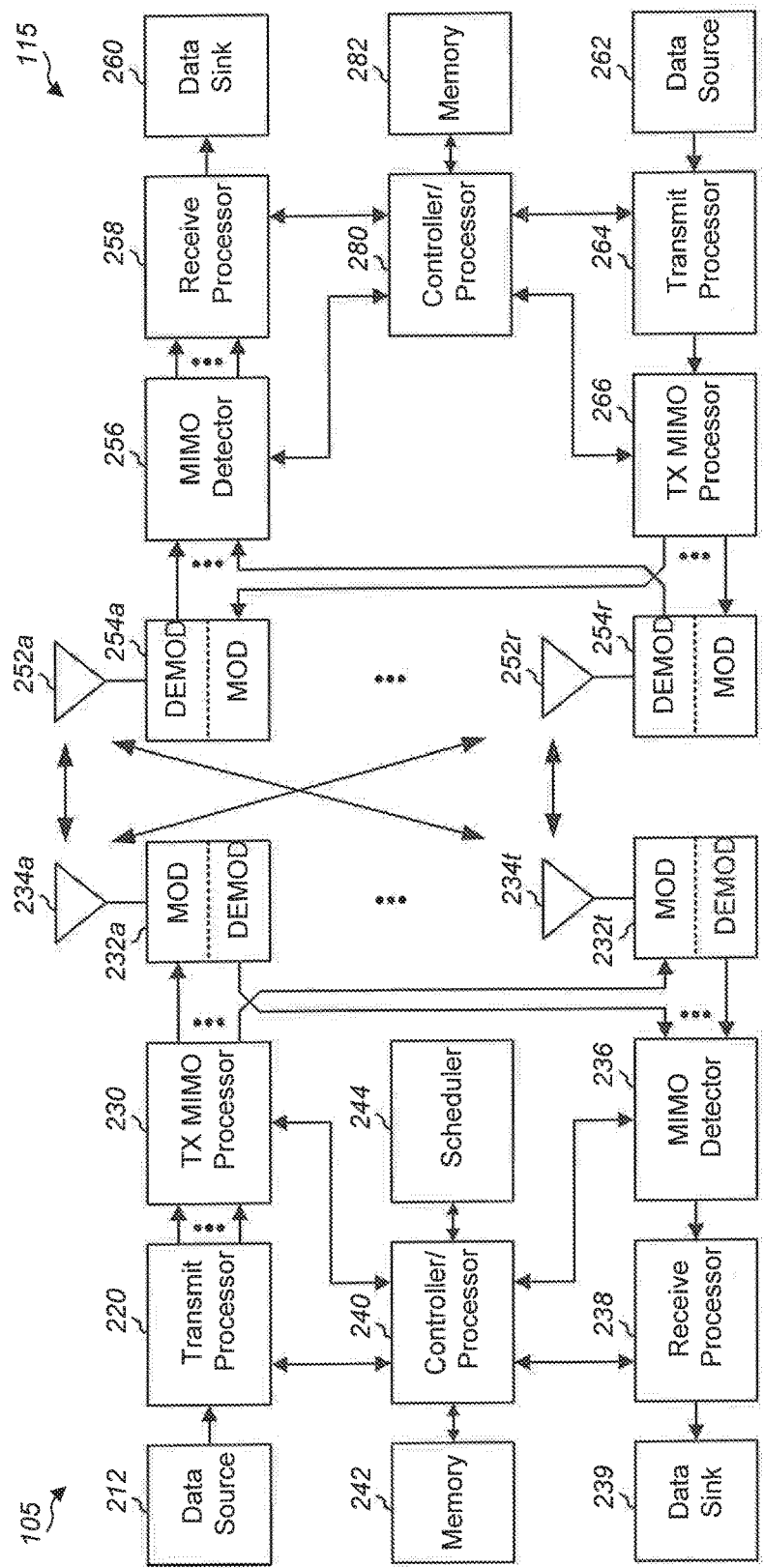
FIG. 2 is a block diagram illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. At the eNB 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the DE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 5A and 5B, and/or other processes for the techniques described herein. The memories 242 and 282 may store data and program codes for the eNB 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
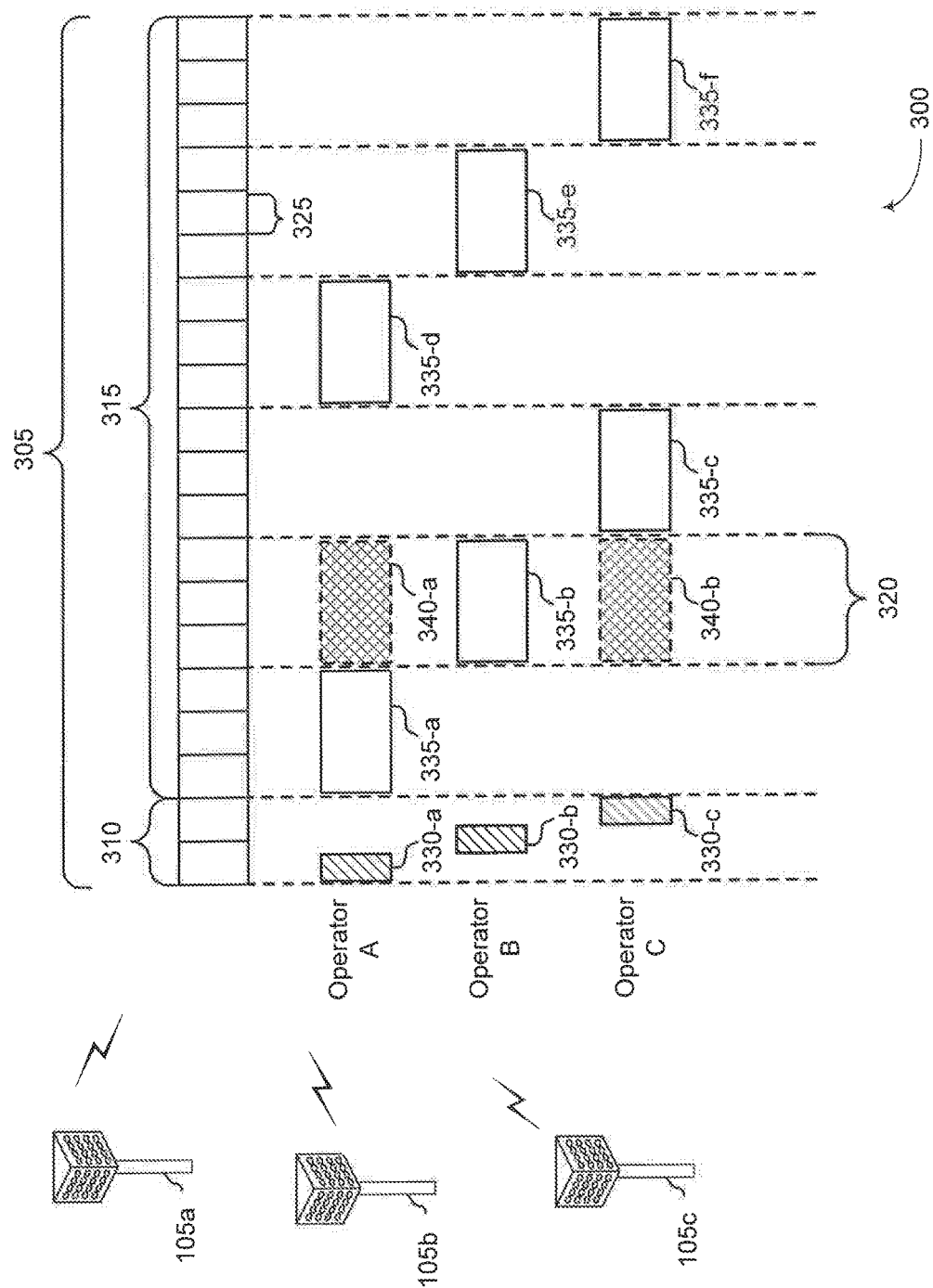
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources, That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-TNT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network. operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In legacy LTE systems, a synchronization (sync) channel may be transmitted every 5 ms. A UE in a random access mode may search for the sync signal in order to collect the timing information to access the network. In millimeter wave (mmW) new radio (NR) design, the sync channel may follow the same 5 ms period. In license assisted access (LAA) leveraging unlicensed or contention-based shared spectrum designs, a sync channel may still be transmitted. However, the cycle of such a sync channel in an unlicensed or contention-based system may be longer in order to reduce synchronization transmission overhead. As the channel is unlicensed/shared, the synchronization design attempts to avoid accessing the channel too frequently to reduce the potential interference effects. As a result, the initial access time for a UE may be longer, simply because there are fewer chances where the sync signal is actually transmitted. To improve the initial access time, LTE-U has an extra design component that provides for the sync channel is embedded or piggybacked onto a downlink data burst (e.g., in subframes 0 and 5). This sync channel is, therefore, opportunistically transmitted to piggy back onto the existing LBT for the data burst. In a mmW shared spectrum network, attempting to piggy back a sync channel to the data burst results in a problem.

In a mmW shared spectrum operation, the sync channel transmission frequency is expected to be reduced, as in the regular LAA or LTE-U scenarios. Thus, there will be an expectation for a similar piggy backing or embedding of sync signal transmissions to increase the sync density opportunistically. However, one of the major differences between mmW and LAA configured systems is that the LBT for mmW operations is a narrow directional beam. The LBT in mmW systems will be performed with a direction beam that will be used for serving the UE later.

Figure 4:
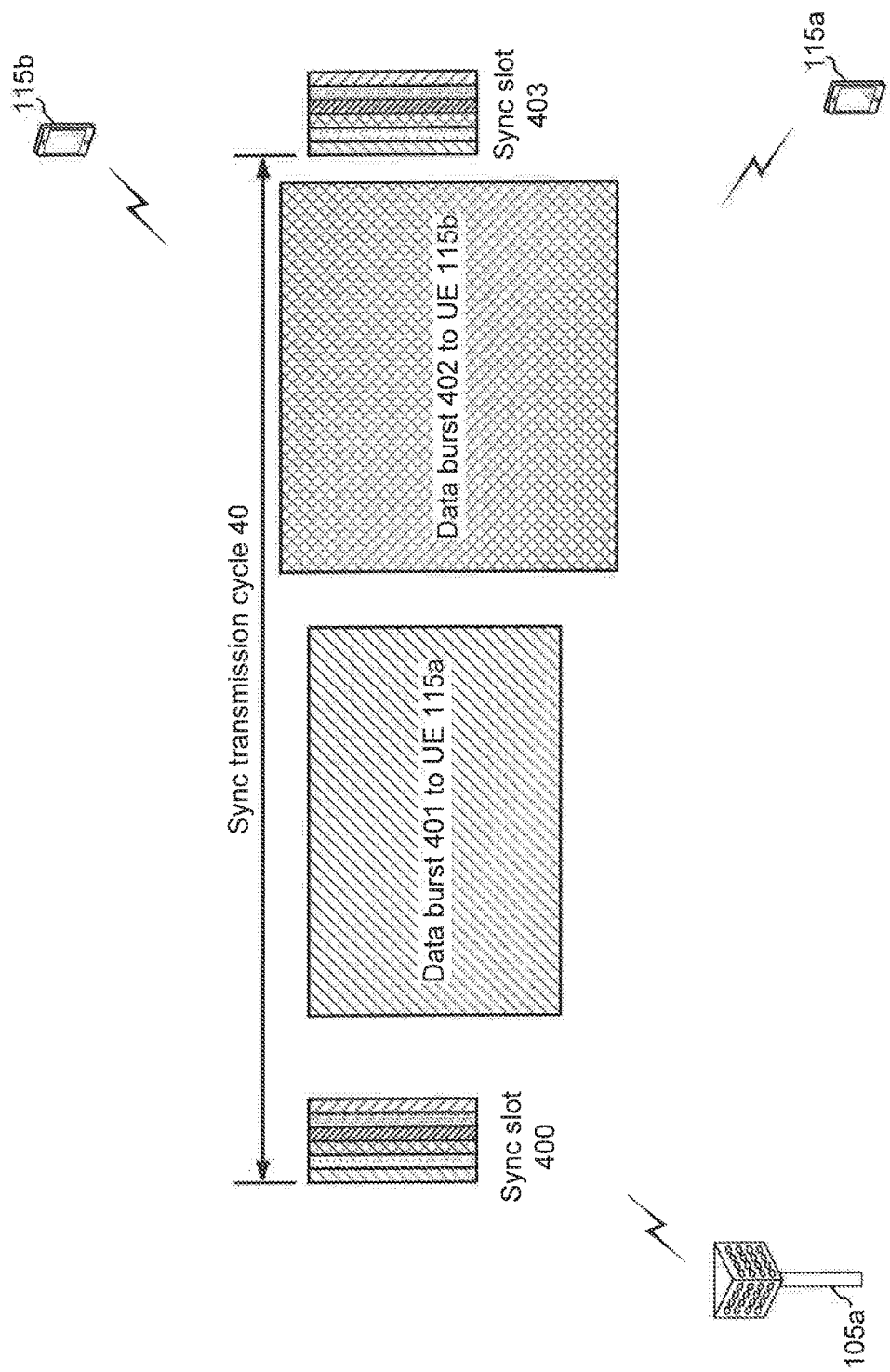
FIG. 4 is a block diagram illustrating a sync transmission cycle from an eNB configured for mmW operations.

FIG. 4 is a block diagram illustrating a sync transmission cycle 40 from an eNB 105a configured for mmW operations. Each sync slot 400 and 403 is composed of multiple sync blocks. Each sync block is generated for a corresponding directional beam for each direction served by eNB 105a. The bundling of the multiple individual sync blocks in sync slots 400 and 403 allows eNB 105 to cover multiple beam directions for scanning. This configuration creates a difficulty for piggybacking a sync slot in a mmW data burst, as the LBT in mmW operations before a data burst does not cover the multiple directional beams used for the sync slot transmission. Data burst 401 of sync transmission cycle slot 40 is transmitted on a single directional beam in the direction of UE 115a, while data burst 402 is transmitted on a different single directional beam in the direction of UE 115b. The LBT performed by eNB 105a for data burst 401 is only for the direct of 115a and the LBT performed for data burst 402 is only for the direction of 115b. Therefore, the additional directional beam included in sync slots 400 and 403 would not be cleared to transmit because no LBT would have been performed for those directions by virtue of data bursts 401 and 402. Moreover, adding additional LBT procedures to the data burst transmissions would unduly add complexity and signaling overhead to the downlink operations. Thus, instead of piggybacking an entire sync slot of multiple sync blocks, various aspects of the present disclosure are directed to piggybacking or embedding a single sync block during the unicast data burst.

Figures 5A, 5B:
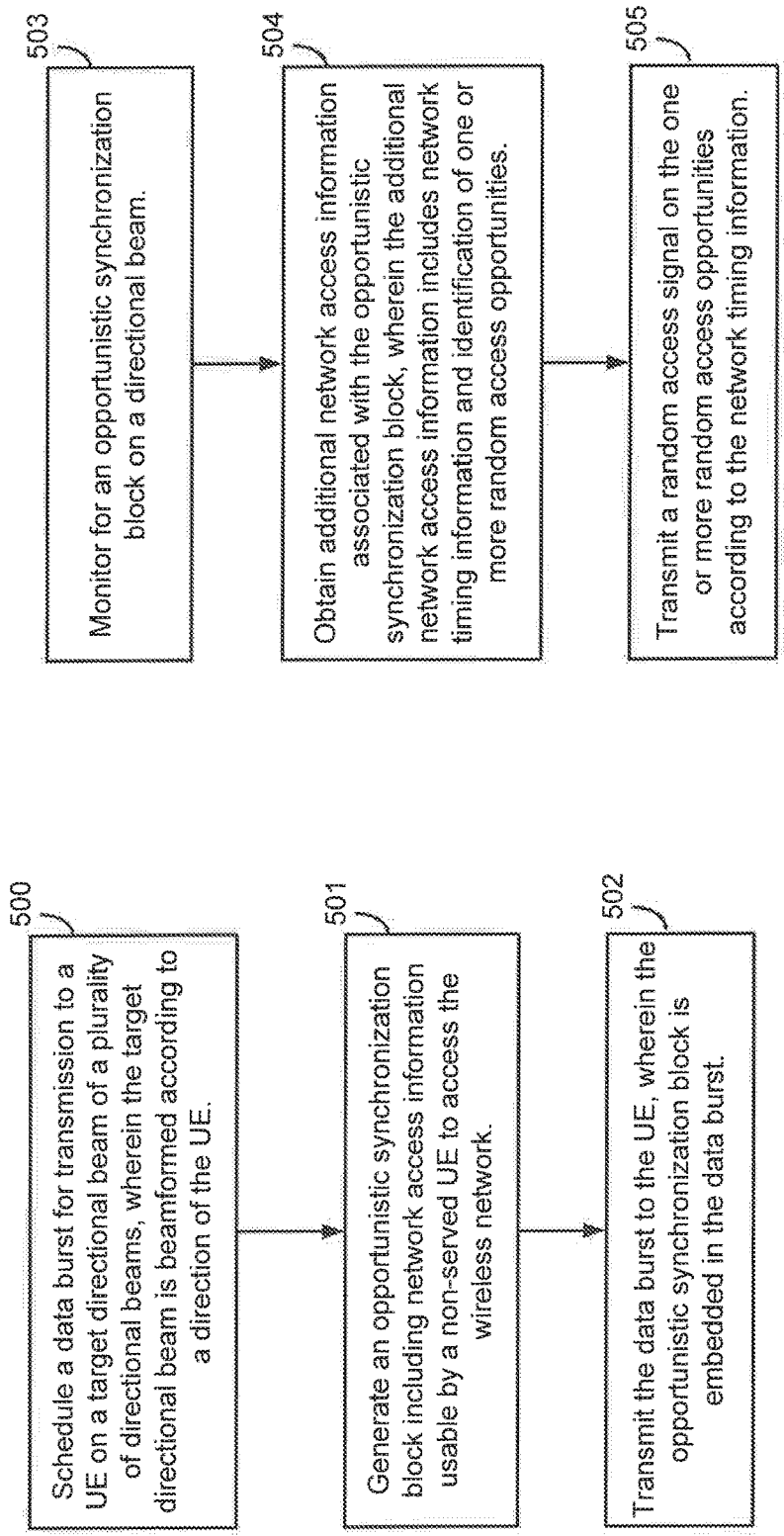
FIGS. 5A and 5B are block diagrams illustrating example blocks executed to implement aspects of the present disclosure.

FIGS. 5A and 5B are block diagrams illustrating example blocks executed to implement aspects of the present disclosure. At block 500 a base station schedules a data burst for transmission to a UE on a target directional beam of a plurality of directional beams, wherein the target directional beam is beamformed according to a direction of the UE. The base station prepares the data burst for the UE for the direction of the UE. Because the network operates using mmW transmissions, each transmission uses beamforming that specifically generates directional beams to the served UE.

At block 501, the base station generates an opportunistic synchronization block including network access information usable by a non-served UE to access the wireless network. In order to provide more synchronization signal transmissions, the base station will generate opportunistic sync blocs associated with the directional beam in the direction of the served UE.

At block 502, the base station transmits the data burst to the UE, wherein the opportunistic synchronization block is embedded into the data burst. The base station piggybacks the opportunistic synchronization block onto the data burst through the embedding. While the data burst is directed to the served UE, the embedded opportunistic synchronization block is intended for non-served UEs looking for initial acquisition to the wireless network.

At block 503 (FIG. 5B), the non-served UE monitors for an opportunistic synchronization block on a directional beam. Because the non-served UE operates in a similar direction from the base station as the served UE, it may detect the piggybacked sync block on the directional beam with the data burst.

At block 504, the non-served UE obtains additional network access information associated with the opportunistic synchronization block, wherein the additional network access information is in addition to timing information carried by a normal synchronization block, and wherein the additional network access information includes network timing information and identification of one or more random access opportunities. In response to detecting the synchronization block in block 503, the non-served UE will obtain additional network access information. For example, the non-served UE may obtain some of the additional network access information from other synchronization block signaling, such as through a physical broadcast channel (PBCH) or similar supplemental network access information channel or signal within the synchronization block or from an additional information signal outside of the synchronization block, but which may be located by the non-served UE using information obtained from within the synchronization block. The additional network access information not only would include the timing information that would allow the non-served UE to decode and communicated with the network, and also identification of various random access opportunities (e.g., RACH opportunities).

At block 505, the non-served UE transmits a random access signal on one of the one or more random access opportunities according to the network timing. Once the non-served UE has the network timing information and information about the location of random access opportunities (e.g., RACH locations), it may complete the RACH procedure using the RACH timing to gain access to the wireless network.

Figure 6:
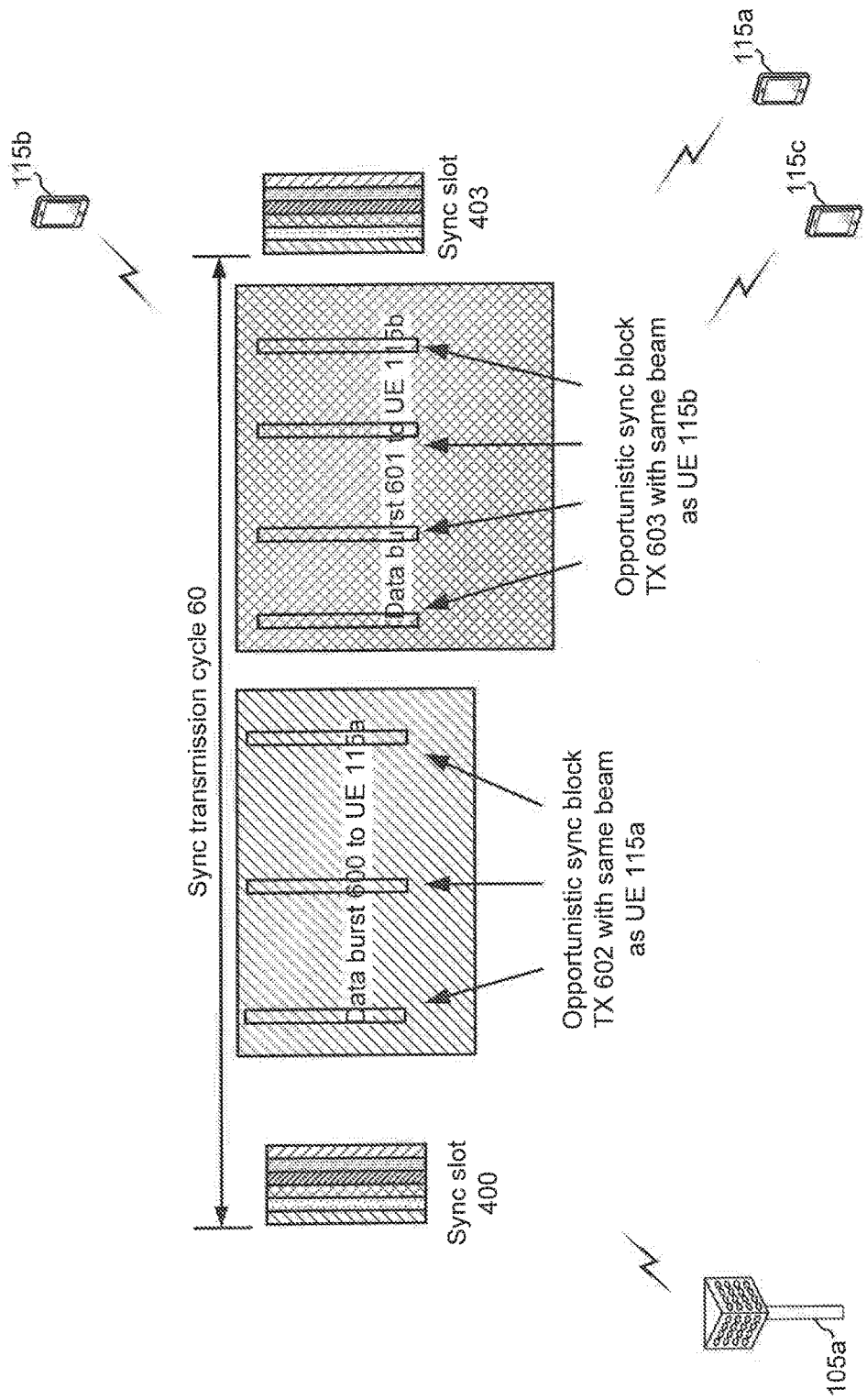
FIG. 6 is a block diagram illustrating a sync transmission cycle for communication between an eNB and UEs configured according to one aspect of the present disclosure.

FIG. 6 is a block diagram illustrating sync transmission cycle 60 for communication between eNB 105a and UEs 115a and 115b, configured according to one aspect of the present disclosure. Within data burst 600 on the directional beam for the direction of UE 115a and data burst 601 on the directional beam for the direction of UE 115b, eNB 105a has embedded or piggybacked opportunistic sync blocks 602 and 603, respectively, associated with the same corresponding directional beams for the directions of UEs 115a and 115b. Using the same beam as data bursts 600 and 601, no separate LBT would be performed for transmitting opportunistic sync blocks 602 and 603. One of the main benefits of this configuration would be improvement of the initial acquisition of UEs that happen to be in a similar beam direction. For example, UE 115c is positioned in a similar location to UE 115a. As such, UE 115c may detect opportunistic sync block 602 piggybacked onto data burst 600.

It should be noted that in a typical use case, many scenarios exist in which UEs are clustered together. Thus, when one UE, such as UE 115a, receives the link with an embedded synchronization signals, the link may assist other, non-served UEs, such as UE 115c, to detect the sync block and obtain the information it may use to access the wireless system.

Figure 7:
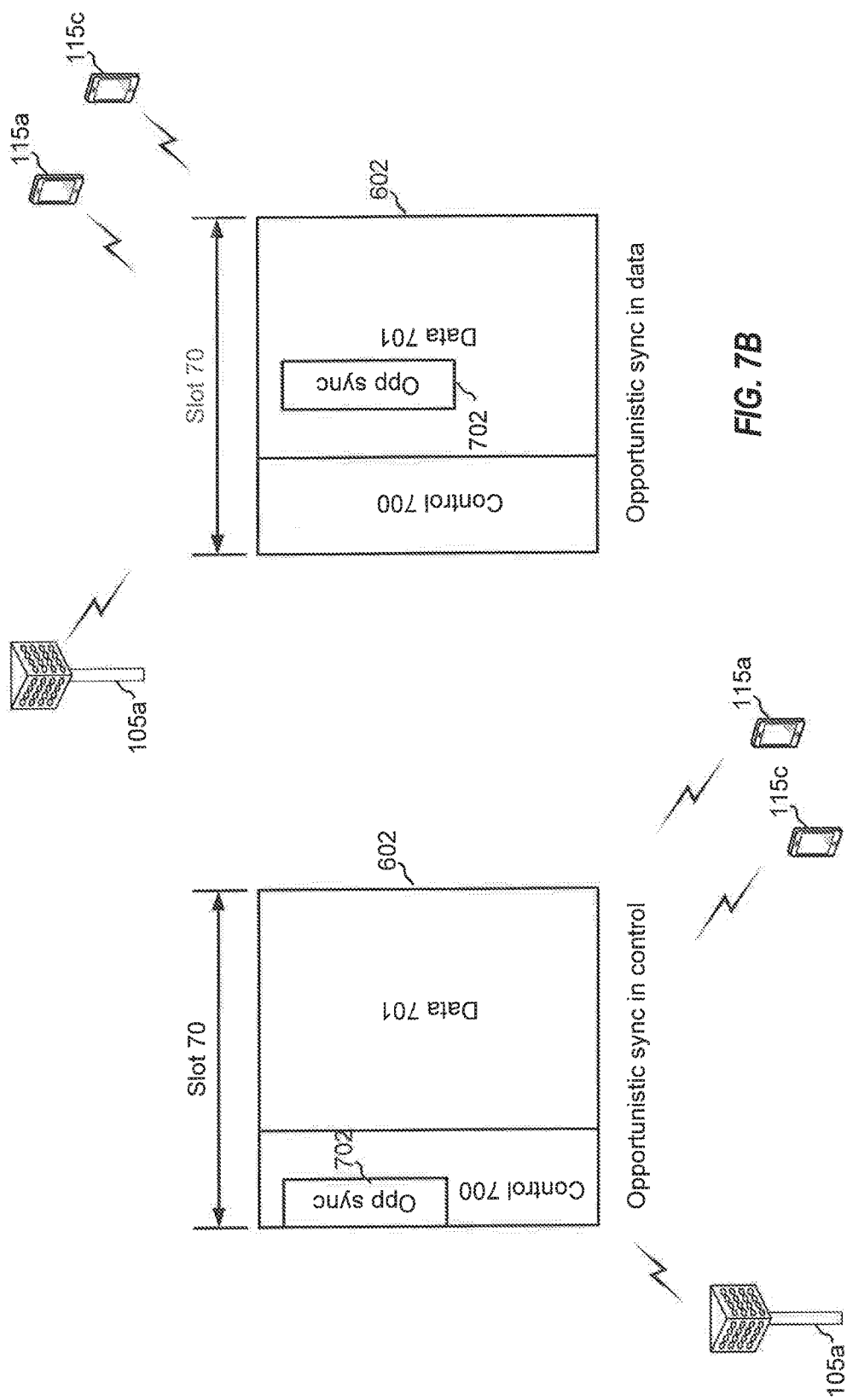
FIGS. 7A and 7B are block diagrams illustrating an eNB and UEs configured according to aspects of the present disclosure.

FIGS. 7A and 7B are block diagrams illustrating an eNB 105a and UE 115a configured according to aspects of the present disclosure. In piggybacking or embedding the sync blocks, an eNB, such as eNB 105a, may place such signals at various locations in the transmission. For example, with respect to the transmission frequency, the sync block may be transmitted in the subband or frequency where normal/periodic/non-opportunistic sync blocks usually are transmitted. Therefore, initial access by a non-served UE, such as UE 115c, may only look for sync blocks in this subband of data burst 600.

With respect to the timing of the transmission, a base station, such as base station 105a, may transmit the sync block in the control portion of a slot or in the data portion of the slot. The waveform design of a given opportunistic sync block 702 (e.g., PSS/SSS/PBCH) may be similar to non-opportunistic sync block waveforms. Thus, signaling to distinguish opportunistic sync block 702 from a normal sync blocks may assist proper operation. For example, opportunistic sync block 702 may be placed at different locations (e.g., time and/or frequency locations), which may have different RACH location implications, etc. When including PSS/SSS, opportunistic sync block 702 may have the same or different sequence selection for PSS/SSS. In either case, the PBCH or other opportunistic supplemental information signal may carry additional information, including an indication of RACH opportunities.

As illustrated in FIG. 7A, data burst 602 includes a control portion 700 and a data portion 701. eNB 115a embeds opportunistic sync block 702 within control portion 700 the synchronization block is placed in a control symbol. The control signals do not typically occupy the full OFDM symbol, due to beamforming limitations. Thus, control channels for different UEs are not typically multiplexed across control portion 700. Because opportunistic sync block 702 may occupy the synchronization subband in FIG. 7A, the control subband of control portion 700 will be placed around it. This approach does not affect data capacity of the data burst to UE 115a as it will be using originally wasted control resources within control portion 700. Moreover, because control portion 700 is at the beginning of slot 70, when detected, the location of opportunistic sync block 702 will indicate the slot boundary. In the case where there are multiple control symbols, an indication that opportunistic sync block 702 is an opportunistic type synchronization channel may be added to a field in the PBCH or other opportunistic supplemental information signal.

Such supplemental information signals may additionally carry more detailed system frame number (SFN) information. Legacy PBCH generally resolve in 10 ms resolution, while sub-10 ms levels may be resolved using the sync channel location. In implementation of mmW with shared spectrum, the one shot transmission of opportunistic sync block 702 may explicitly indicate the slot index up to a per slot basis. The supplemental information signals (e.g., opportunistic supplemental information signal within the sync block, additional network information signal outside of the sync block, etc.) may further carry information or identification of corresponding random access opportunities for random access UEs, such as UE 115c.

FIG. 7B illustrates a second alternative, in which eNB 105a embeds opportunistic sync block 702 in data portion 701 of data burst 602. Data burst 602 includes control portion 700 and data portion 701 within slot 70. The location of opportunistic sync block 702 within data portion 701 will impact the data channel resource and affect data rate. However, there is more flexibility available for embedding in data portion 701.

For the unicast UE, UE 115a, being served by data burst 602, eNB 105a will rate match around the opportunistic sync block 702. If UE resource assignment does not overlap with opportunistic sync block 702 (FDM), there will be no such issue for UE 115a attempting to decode opportunistic sync block 702 as a part of the downlink data. However, when resource assignments overlap various manners for identifying opportunistic sync block 702 to UE 115a may be implemented. For example, if transmission of opportunistic sync block 702 is fixed or semi-statically configured, then there may be no need to dynamically indicate to UE 115a In such case, the network may be configured to signal UE 115a that opportunistic sync block 702 will be transmitted in a certain OFDM symbol in certain set of slots (such as the 5th symbol in all slots with slot number equals 3 mod 20). This indication may occur routinely through system information block (SIB) messages or the like, or via RRC messaging for semi-static indication.

When an eNB, such as eNB 105a, has the freedom to embed opportunistic sync block 702 in data bursts, such as data bursts 602 and 603 (FIG. 6), eNB 105a may dynamically signal UE 115a of the opportunistic transmission. For example, eNB 105a may signal which symbol and/or which slot opportunistic sync block has been transmitted. For unicast UE, UE 115a, eNB 105a may indicate the existence of opportunistic sync block 702 by using a field in a downlink control information (DCI) message. Where the symbol index for opportunistic sync transmissions is fixed, then eNB 105a may only need to indicate whether or not opportunistic sync block 702 has been transmitted. In other alternative aspects, such as where the symbol index may be flexible as well, eNB 105 may dynamically indicate both whether or not an opportunistic sync transmission has occurred and identify in which symbol the transmission has occurred.

To improve the UE initial acquisition performance, in addition to providing more sync block transmissions, additional random access opportunities may be provided as well. If a UE, such as UE 115c, detects opportunistic sync block 702 but cannot perform a random access procedure for a long time because of a lack of random access timing, the initial acquisition has not fundamentally improved.

Figure 8:
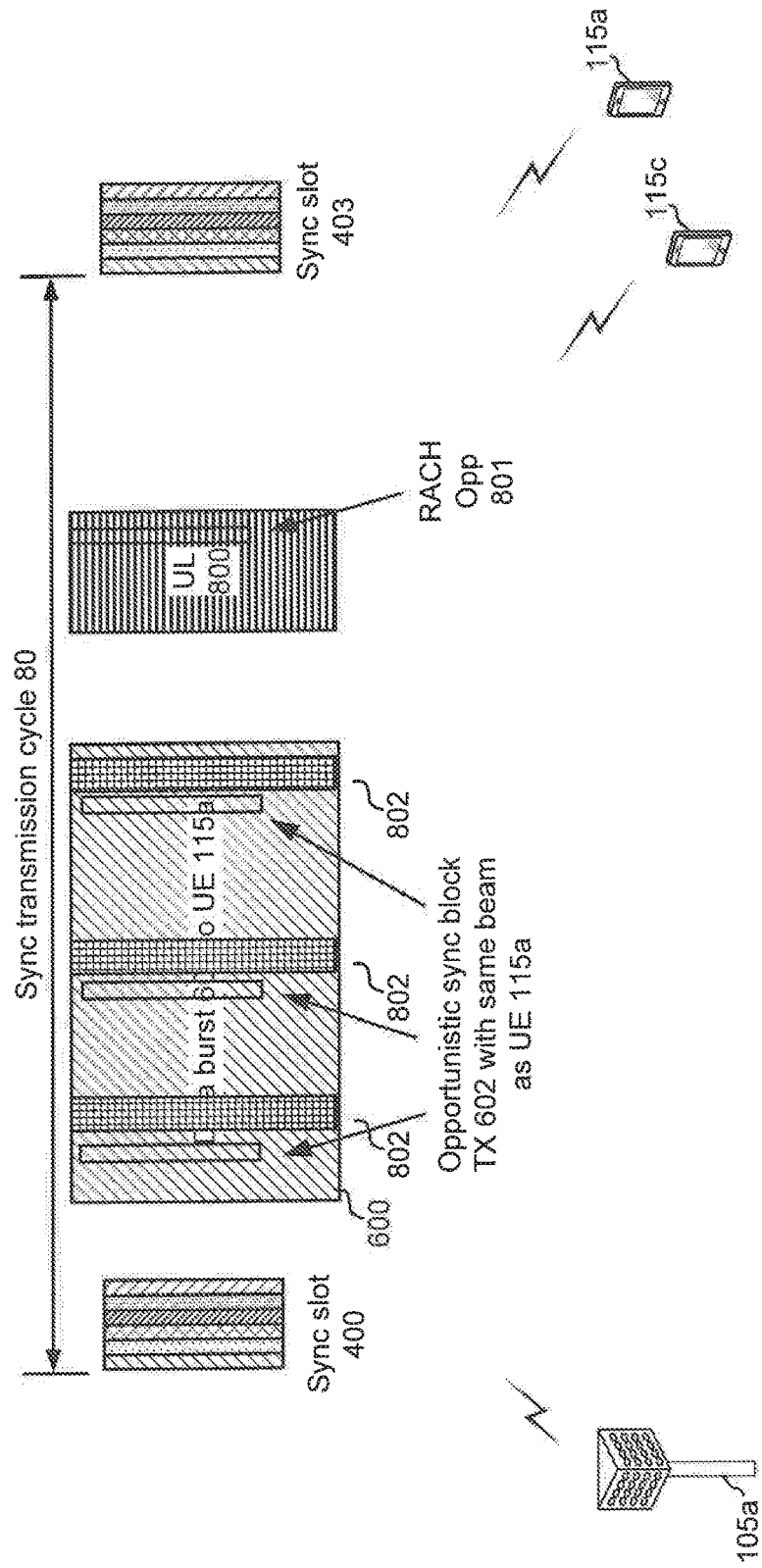
FIG. 8 is a block diagram illustrating an eNB and UEs configured according to one aspect of the present disclosure.

FIG. 8 is a block diagram illustrating eNB 105a and UEs 115a and 115c configured according to one aspect of the present disclosure. One approach for various aspects of the present disclosure is to grant random access opportunities from the opportunistic sync blocks. A random access opportunity may arise during the time that UE 115a is scheduled for uplink transmission. If data burst 600 is a downlink grant to unicast UE 115a, UE 115a will feedback acknowledgements (ACK/NACK) in uplink burst 800 via a PUCCH, for example. If data burst 600 is an uplink grant to unicast UE 115a, UE 115a will transmit PUSCH at uplink burst 800. In either case, when unicast UE 115a is transmitting, eNB 105a will tune its receiver beam to receive the transmissions from UE 115a at uplink burst 800. This same receiver beam would receive RACH request at RACH opportunity 801 from initial acquisition UE, UE 115c.

For example, during data burst 600, eNB 105a embeds opportunistic sync blocks 602 within the same directional beam. UE 115c detects opportunistic sync blocks 602 and, via an opportunistic supplemental information signal within opportunistic sync block 602, identifies RACH opportunity 801. UE 115c may, thereafter, transmit a random access request during RACH opportunity 801 to be received at eNB 105a using the same directional receiver beam.

It should be noted that the opportunistic RACH waveform may be different from a normal RACH waveform in order to simplify eNB processing. The random access opportunity information may be carried fully via PBCH or other such opportunistic supplemental information signals, including RACH timing, within opportunistic sync block 602. If additional information may be useful for initial acquisition UEs an additional information signal 802 outside of opportunistic sync block 602 may be defined that may collect some or all additional information related to RACH opportunities. In such an aspect that uses additional information signal 802 outside of opportunistic sync block 602, the eNB, such as eNB 105a, may include a downlink grant within opportunistic sync block 602 identifying additional information signal 802 that carries the additional network access information, including RACH timing and the like. In order to leverage additional information signal 802 outside of opportunistic sync block 602, it may be beneficial to place opportunistic sync block 602 and additional information signal 802 in the control portion of the data burst, such as control portion 701 (FIG. 7A).

Figure 9:
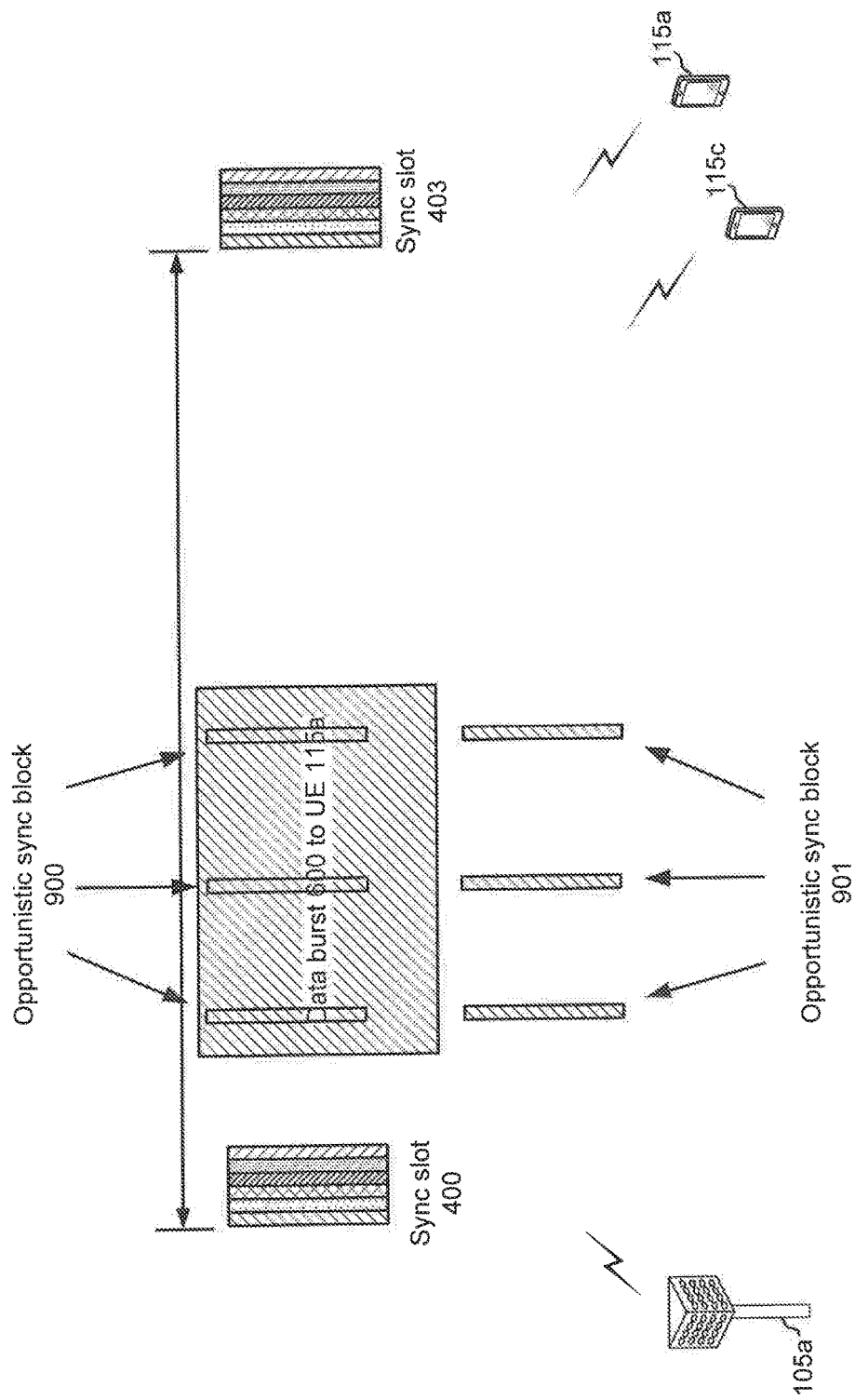
FIG. 9 is a block diagram illustrating an eNB and UEs configured according to one aspect of the present disclosure.

FIG. 9 is a block diagram illustrating eNB 105a and UEs 115a and 115c configured according to one aspect of the present disclosure. As illustrated with respect to FIG. 8, when transmitting opportunistic sync block 602, the frequency of transmission was selected to be the standard synchronization channel frequency. In the alternative aspect illustrated in FIG. 9, eNB 105a not only transmits opportunistic sync blocks 900 within the timing of data burst 600 at the standard synchronization channel frequencies, eNB 105a also transmits additional opportunistic sync blocks 901 at a different frequency. The different frequency may still be at a standard synchronization channel frequency, but it is one that is not generally used for synchronization channels within the frequency raster of the carrier used for transmitting the directional beam of data burst 600 to served UE 115a. In operation, then, if, initial acquisition UE 115c is scanning frequencies for network access, there is a greater opportunity that synchronization information may be detected via detection of either opportunistic sync blocks 900 or 901.

In legacy LTE, PSS/SSS provides cell ID and the 10 ms boundary information. In licensed mmW, the PSS/SSS may carry about the same information. However, with shared spectrum mmW, because of the longer sync period, a normal sync slot PSS/SSS may carry lower resolution time information (e.g., 40 ms). In such aspects, the PBCH or opportunistic supplemental information signal may carry SFN information to form the complete timing information.

Moreover, within the opportunistic sync slot, such as opportunistic sync block 602 (FIG. 6) the sequence forming the PSS/SSS may be the same or different from non-opportunistic synchronization signals. In a first alternative aspect, when the same sequence is used, a UE, such as UE 115a or UE 115c, may detect this and use additional information from either an opportunistic supplemental information signal within the sync slot or an additional signal outside of the sync slot that identifies the synchronization signal as an opportunistic type. In such a manner, the detecting UE may then properly apply the slot timing information. In a second alternative aspect, when a different sequence is used for the synchronization signal (e.g., PSS/SSS), a UE, such as UE 115a or UE 115c may perform additional cross correlation to discover the PSS/SSS. However, when detected, UE 115a or 115c would know this is an opportunistic sync block. With this alternative aspect using a different sequence, the PBCH, opportunistic supplemental information signal, or additional signal may also contain additional RACH opportunity information and additional information for timing recovery. The PBCH or opportunistic supplemental information signal may also carry the cell ID, as it may not be included within the synchronization signals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A and 5B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a wireless network, comprising:
   scheduling, at a base station, a data burst for transmission to a user equipment (UE) on a target directional beam of a plurality of directional beams available to the base station, wherein the target directional beam is beamformed according to a direction of the UE;
   generating an opportunistic synchronization block including network access information usable by a non-served UE to access the wireless network; and
   transmitting the data burst to the UE, wherein the opportunistic synchronization block is embedded in the data burst.

2. The method of claim 1, further including:
   transmitting the opportunistic synchronization block at a same frequency as a synchronization channel.

3. The method of claim 1, further including;
   transmitting the opportunistic synchronization block at a standard synchronization channel transmission frequency, not used by a synchronization channel of a carrier of the target directional beam.

4. The method of claim 1, further including:

transmitting the opportunistic synchronization block at one of:
a control portion of the data burst; or
a data portion of the data burst.

5. The method of claim 4, wherein the transmitting the opportunistic synchronization block includes at least one of:
frequency division multiplexing the opportunistic synchronization block with one or more control symbols within the control portion of the data burst; or
transmitting the opportunistic synchronization block into the data portion of the data burst at least in part by rate matching data symbols around the opportunistic synchronization block within the data burst.

6. The method of claim 5, further including:
selecting, by the base station, a location within the data portion for the transmitting the opportunistic synchronization block;
signaling the location within the control portion of the data burst; and
transmitting an indicator to the UE identifying the location and the opportunistic synchronization block.

7. The method of claim 6, wherein the transmitting the indicator identifying the location includes one of:
transmitting a synchronization block activation flag when the location of the opportunistic synchronization block is semi-statically configured with RRC signaling; or
transmitting the synchronization block activation flag and the location when the location of the opportunistic synchronization block is dynamically selected by the base station, where the synchronization block activation flag indicates presence of the opportunistic synchronization block and the location indicates the location of the opportunistic synchronization block.

8. The method of claim 1, wherein the network access information includes one or more of:
an opportunistic type identifier identifying the opportunistic synchronization block as an opportunistic type;
a slot index of the opportunistic synchronization block;
slot boundary;
identification of a system frame number (SFN) associated with the opportunistic synchronization block;
one or more random access opportunities associated with the opportunistic synchronization block;
cell identifier (ID);
a pointer to a secondary signal, wherein the secondary signal includes additional network access information.

9. The method of claim 8, wherein the one or more random access opportunities include one or more of:
one or more acknowledgement locations for the UE to acknowledge a downlink communication of the data burst; and
one or more uplink transmission opportunities for the UE granted by the base station.

10. The method of claim 1, wherein a waveform of the opportunistic synchronization block includes one or more of:
a synchronization signal; and
an opportunistic supplemental information signal.

11. The method of claim 10,
wherein the synchronization signal of the opportunistic synchronization block is formed using at least one of:
a same sequence as a non-opportunistic synchronization signal, or
a different sequence from a sequence for a non-opportunistic synchronization signal, and
wherein the opportunistic supplemental information signal includes at least one of:

an opportunistic type identifier identifying the synchronization signal for the opportunistic synchronization block;
one or more random access opportunities associated with the opportunistic synchronization block,
cell identifier (ID), or
a pointer to a secondary signal, wherein the secondary signal includes additional network access information.

12. A method of wireless communication, comprising:
monitoring, by a user equipment (UE), for an opportunistic synchronization block on a directional beam;
obtaining additional network access information associated with the opportunistic synchronization block in response to detection of the opportunistic synchronization block, wherein the additional network access information is in addition to timing information carried by a normal synchronization block, and wherein the additional network access information includes network timing information and identification of one or more random access opportunities; and
transmitting a random access signal on the one or more random access opportunities according to the network timing information.

13. The method of claim 12, wherein the obtaining includes:
receiving a downlink grant within the opportunistic synchronization block for an opportunistic additional information signal, wherein the opportunistic additional information signal includes at least the identification of the one or more random access opportunities.

14. The method of claim 12, further including:
detecting a synchronization signal within the opportunistic synchronization block, wherein the synchronization signal is configured with a same sequence as a non-opportunistic synchronization signal, wherein the additional network access information includes an indicator indicating the synchronization signal is associated with the opportunistic synchronization block.

15. The method of claim 12, further including:
detecting a synchronization signal within the opportunistic synchronization block, wherein the synchronization signal is configured with a different sequence as a non-opportunistic synchronization signal.

16. An apparatus configured for wireless communication, the apparatus comprising:
at least one processor; and
a memory coupled to the at least one processor,
wherein the at least one processor is configured:
to schedule, at a base station, a data burst for transmission to a user equipment (UE) on a target directional beam of a plurality of directional beams available to the base station, wherein the target directional beam is beamformed according to a direction of the UE;
to generate an opportunistic synchronization block including network access information usable by a non-served UE to access the wireless network; and
to transmit the data burst to the UE, wherein the opportunistic synchronization block is embedded in the data burst.

17. The apparatus of claim 16, further including configuration of the at least one processor to transmit the opportunistic synchronization block at a same frequency as a synchronization channel.

18. The apparatus of claim 16, further including configuration of the at least one processor to transmit the opportunistic synchronization block at a standard synchronization channel transmission frequency, not used by a synchronization channel of a carrier of the target directional beam.

19. The apparatus of claim 16, further including configuration of the at least one processor to transmit the opportunistic synchronization block at one of:
   a control portion of the data burst; or
   a data portion of the data burst.

20. The apparatus of claim 19, wherein configuration of the at least one processor to transmit the opportunistic synchronization block includes configuration to at least one of:
   frequency division multiplex the opportunistic synchronization block with one or more control symbols within the control portion of the data burst; or
   transmit the opportunistic synchronization block into the data portion of the data burst, at least in part by rate matching data symbols around the opportunistic synchronization block within the data burst.

21. The apparatus of claim 20, further including configuration of the at least one processor:
   to select, by the base station, a location within the data portion for the program code executable by the computer for causing the computer to transmit the opportunistic synchronization block;
   to signal the location within the control portion of the data burst; and
   to transmit an indicator to the UE identifying the location and the opportunistic synchronization block.

22. The apparatus of claim 21, Wherein configuration of the at least one processor to transmit the indicator identifying the location includes configuration of the at least one processor to one of:
   transmit a synchronization block activation flag when the location of the opportunistic synchronization block is semi-statically configured with RRC signaling; or
   transmit the synchronization block activation flag and the location when the location of the opportunistic synchronization block is dynamically selected by the base station, where the synchronization block activation flag indicates presence of the opportunistic synchronization block and the location indicates the location of the opportunistic synchronization block.

23. The apparatus of claim 16, wherein the network access information includes one or more of:
   an opportunistic type identifier identifying the opportunistic synchronization block as an opportunistic type;
   a slot index of the opportunistic synchronization block;
   slot boundary;
   identification of a system frame number (SFN) associated with the opportunistic synchronization block;
   one or more random access opportunities associated with the opportunistic synchronization block;
   cell identifier (ID);
   a pointer to a secondary signal, wherein the secondary signal includes additional network access information.

24. The apparatus of claim 23, wherein the one or more random access opportunities include one or more of:
   one or more acknowledgement locations for the UE to acknowledge a downlink communication of the data burst; and
   one or more uplink transmission opportunities for the UE granted by the base station.

25. The apparatus of claim 16, wherein a waveform of the opportunistic synchronization block includes one or more of:
   a synchronization signal; and
   an opportunistic supplemental information signal.

26. The apparatus of claim 25,
   wherein the synchronization signal of the opportunistic synchronization block is formed using at least one of:
      a same sequence as a non-opportunistic synchronization signal, or
      a different sequence from a sequence for a non-opportunistic synchronization signal, and
   wherein the opportunistic supplemental information signal includes at least one of:
      an opportunistic type identifier identifying the synchronization signal for the opportunistic synchronization block,
      one or more random access opportunities associated with the opportunistic synchronization block,
      cell identifier (ID), or
      a pointer to a secondary signal, wherein the secondary signal includes additional network access information.

27. An apparatus configured for wireless communication, the apparatus comprising:
   at least one processor; and
   a memory coupled to the at least one processor,
   wherein the at least one processor is configured:
      to monitor, by a user equipment (UE), for an opportunistic synchronization block on a directional beam;
      to obtain additional network access information associated with the opportunistic synchronization block in response to detection of the opportunistic synchronization block, wherein the additional network access information is in addition to timing information carried by a normal synchronization block, and wherein the additional network access information includes network timing information and identification of one or more random access opportunities; and
      to transmit a random access signal on the one or more random access opportunities according to the network timing information.

28. The apparatus of claim 27, wherein the configuration of the at least one processor to obtain includes configuration to receive a downlink grant within the opportunistic synchronization block for an opportunistic additional information signal, wherein the opportunistic additional information signal includes at least the identification of the one or more random access opportunities.

29. The apparatus of claim 27, further including configuration of the at least one processor to detect a synchronization signal within the opportunistic synchronization block, wherein the synchronization signal is configured with a same sequence as a non-opportunistic synchronization signal, wherein the additional network access information includes an indicator indicating the synchronization signal is associated with the opportunistic synchronization block.

30. The apparatus of claim 27, further including configuration of the at least one processor to detect a synchronization signal within the opportunistic synchronization block, wherein the synchronization signal is configured with a different sequence as a non-opportunistic synchronization signal.

\* \* \* \* \*